(12) United States Patent
Kass et al.

(10) Patent No.: US 11,257,015 B2
(45) Date of Patent: Feb. 22, 2022

(54) IMPACT NETWORK

(71) Applicant: Accenture Global Solutions Limited, Dublin (IE)

(72) Inventors: Alex M. Kass, Palo Alto, CA (US); Michael J. Biltz, San Francisco, CA (US)

(73) Assignee: Accenture Global Solutions Limited, Dublin (IE)

( * ) Notice: Subject to any disclaimer, the term of this patent is extended or adjusted under 35 U.S.C. 154(b) by 0 days.

(21) Appl. No.: 17/007,987

(22) Filed: Aug. 31, 2020

(65) Prior Publication Data

US 2021/0326789 A1 Oct. 21, 2021

Related U.S. Application Data (60) Provisional application No. 63/011,038, filed on Apr. 16, 2020.

(51) Int. Cl.
*G06Q 10/06* (2012.01)
*G06Q 30/06* (2012.01)

(52) U.S. Cl.
CPC ... *G06Q 10/06313* (2013.01); *G06Q 30/0621* (2013.01)

(58) Field of Classification Search
None
See application file for complete search history.

(56) References Cited

U.S. PATENT DOCUMENTS

| | | | |
|---|---|---|---|
| 10,756,990 B1* | 8/2020 | Chakkassery Vidyadharan | G06N 20/00 |
| 10,963,596 B1* | 3/2021 | Wood | G06F 8/65 |
| 2002/0173867 A1* | 11/2002 | Duncan | G06F 30/00 700/97 |
| 2005/0196730 A1* | 9/2005 | Kellman | G09B 5/00 434/118 |
| 2007/0162375 A1* | 7/2007 | Delf, Jr. | G06Q 40/02 705/36 R |
| 2007/0203996 A1* | 8/2007 | Davitz | G06F 16/90335 709/206 |
| 2013/0144566 A1* | 6/2013 | De Biswas | G06T 17/005 703/1 |
| 2015/0073753 A1* | 3/2015 | Rameau | G06F 30/00 703/1 |
| 2015/0234944 A1* | 8/2015 | Marceau | G06F 30/13 703/1 |

(Continued)

*Primary Examiner* — Sujay Koneru
(74) *Attorney, Agent, or Firm* — Fish & Richardson P.C.

(57) ABSTRACT

This document describes impact networks that enable stakeholders to measure and take actions to adjust the impact of changes to products and services. In one aspect, a method includes receiving a stakeholder impact graph defining stakeholders. Each stakeholder is a node that is connected to at least one other stakeholder by an impact relationship edge. Data defining a first design perturbation in one or more design properties for a product or service of a first stakeholder is received from the first stakeholder. A determination is made, for one or more second stakeholders of the stakeholders connected to the first stakeholder by a respective impact relationship edge, a respective impact on the second stakeholder caused by the first design perturbation. Data defining a remediation perturbation that adjusts the respective impact of the first deign perturbation on the one or more second stakeholders is received.

20 Claims, 5 Drawing Sheets

(56) References Cited

U.S. PATENT DOCUMENTS

| | | | |
|---|---|---|---|
| 2016/0048938 A1* | 2/2016 | Jones | H04L 41/065 705/7.28 |
| 2017/0236081 A1* | 8/2017 | Smith et al. | G06Q 10/067 705/7.36 |
| 2018/0300433 A1* | 10/2018 | Maxam | G06F 30/13 |
| 2019/0087733 A1* | 3/2019 | Dooley | G06N 20/00 |

* cited by examiner

IMPACT NETWORK

CROSS-REFERENCE TO RELATED APPLICATION

This application claims the benefit of U.S. Provisional Application No. 63/011,038, filed Apr. 16, 2020, and titled "Impact Network," which is incorporated by reference.

TECHNICAL SUMMARY

This specification relates to an impact network that enables stakeholders to measure and take actions to adjust the impact of changes to products and services.

BACKGROUND

Understanding the relationship between different stakeholders, e.g., consumers, other manufacturers, and government entities, can affect design decisions for products and services. Design decisions can be affected by the impact that changes to products and services have on stakeholders.

SUMMARY

Implementations of the present disclosure are generally related to an impact network that connects an ecosystem of stakeholders, each having their own goals and priorities and who are impacted by a particular product or service. Each stakeholder of the ecosystem can use the impact network to dynamically predict and quantifiably measure an impact that changes to the product or service can have on the ecosystem, e.g., on other stakeholders in the ecosystem. The impact network can aggregate changes made to products and services across the ecosystem and provide data that enables stakeholders and other users to understand how these aggregated changes affect the stakeholders of the ecosystem. The impact network can also enable the stakeholders to adjust the impact, e.g., by changing design properties of the particular product or service, introducing a new product or service, or changing design properties of a different product or service to remediate or otherwise adjust the impact of the particular product or service.

In some implementations, actions include receiving a stakeholder impact graph defining a plurality of stakeholders, wherein each stakeholder is a node that is connected to at least one other stakeholder by an impact relationship edge; receiving, from a first stakeholder of the plurality of stakeholders, data defining a first design perturbation in one or more design properties for a product or service of the first stakeholder; determining, for one or more second stakeholders of the plurality of stakeholders connected to the first stakeholder by a respective impact relationship edge, a respective impact on the second stakeholder caused by the first design perturbation; providing, to at least one of the first stakeholder or the one or more second stakeholders, data specifying the impact to the one or more second stakeholders; and receiving, from at least one of the first stakeholder or at least one of the one or more second stakeholders, data defining a remediation perturbation that adjusts the respective impact of the first deign perturbation on the one or more second stakeholders. Other implementations of this aspect include corresponding systems, apparatus, and computer programs, configured to perform the actions of the methods, encoded on computer storage devices.

These and other implementations can each optionally include one or more of the following features. In some aspects, receiving the data defining the remediation perturbation includes receiving, from a given second stakeholder, data defining a second design perturbation in one or more second design properties of a second product or service that reduces the impact of the first design perturbation on the one or more second stakeholders. The second product can include a new product or service that, if implemented, would reduce the impact of the first design perturbation on the one or more second stakeholders.

In some aspects, receiving the data defining the remediation perturbation includes, receiving, from the first stakeholder, data defining a second perturbation in the one or more design properties of the product or service of the first stakeholder. The second perturbation in the one or more design properties can include a change in at least one of the one or more design properties of the product or service.

In some aspects, providing the data specifying the impact to each of the second stakeholders includes providing, in an interactive application environment, the data specifying the impact to each of the second stakeholders to each of the first stakeholder and the one or more second stakeholders. The interactive application environment facilitates an exchange of design perturbations and remediation perturbations by the stakeholders. Modified impacts are determined from the exchanged design perturbations and remediation perturbations in real-time.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The subject matter described in this specification can be implemented in particular embodiments so as to realize one or more of the following advantages. The impact networks described in this document enable the measurement and visualization of impacts of perturbations in design properties on other stakeholders, including stakeholders that are not directly connected to the stakeholder causing the perturbation and those that are indirectly impacted. The impact networks also enable stakeholders to adjust the impact in various ways, such as changing the design properties causing the impact, introducing a product or service that remediates or enhances the impact, and/or changing design properties of another product or service. The impact network enables stakeholders to visualize the adjustment to the impact provided by one of these solutions and facilitates the conversation or negotiation between stakeholders to come to a consensus on design properties and/or remediation/enhancement products or services.

The details of one or more implementations of the present disclosure are set forth in the accompanying drawings and the description below. Other features and advantages of the present disclosure will be apparent from the description and drawings, and from the claims.

BRIEF DESCRIPTION OF DRAWINGS

Like reference numbers and designations in the various drawings indicate like elements.

DETAILED DESCRIPTION

In general, this document describes impact networks that enable ecosystems of connected stakeholders to measure, visualize, and adjust the impact of design perturbations in design properties of products and/or services. Impacted stakeholders are each affected in positive or negative ways by a product or service corresponding to an impact network, e.g., a product or service at the center of the ecosystem. For example, an impact network for a particular tire can include, as stakeholders, a tire manufacturer than manufactures the particular tire, organizations (e.g., municipalities) that are responsible for maintaining the roads, people that live where the tires are used, manufacturers or other users of products that use the same material as the particular tire, workers at the factories that produce the tires, and so on. When the design properties of the particular product change, this perturbation can affect each of the stakeholders in various ways. For example, if the updated design properties result in more noise when the tires are in use, this can negatively impact the people who live where the tires are used. However, if the updated design properties reduces the wear on the roads and/or reduce the number of accidents, this provides a positive impact on the municipalities and the people live where the tires are used.

Some stakeholders are impacted in direct and obvious ways, while others are impacted in indirect ways. For example, the owner of a car is impacted in obvious ways by all of the car's attributes, such as comfort, reliability, fuel efficiency, etc. However, the car owner's neighbors, for example, are also impacted indirectly by the noise the car makes, the pollutants it produces, the damage it might cause to the local roads, etc. The impact can also be propagated to other stakeholders. For example, if the noise of the car affects the mood or productivity of the neighbor, this can affect the neighbor's family, friends, employer, or coworkers. The impact networks described in this document can measure and/or predict the impact on zero order relationships (e.g., the person who bought the car), first order relationships (e.g., the neighbors) and higher order relationships (e.g., the associates of the neighbors).

An important aspect of the impact networks is the ability to accurately measure the impact of changes to design properties on the various stakeholders. This is made possible in part by the technology of sensing and analytics. The impact networks described herein can leverage various types of sensors, e.g., Internet of Thing (IoT) sensors and machine learning models to process the outputs of the sensors and provide valuable insights, and even quantifiably measures or estimates, of the impact on a large ecosystem of stakeholders of event relatively small design elements of a product or service.

The ability to sense, measure, and analyze the impact of design properties of a product or service enables by the impact networks opens up a number of possibilities, including accountability for the impacts and an active market in the impacts. The impact networks can provide incentives and mechanisms to support the amplification of positive, and mitigation or remediation of negative impacts. For example, an impact network system can provide user interfaces or interactive applications that enable communication/negotiation between stakeholders. In another example, the impact network system can enable stakeholders to exchange credits, e.g., that are issued to the stakeholders for providing positive impacts.

The impact networks can be managed by a governing body. This governing body can maintain the integrity of the impact networks, certify official analysis of collected data, and enforce accountability. The governing body can also determine and set amounts (e.g., monetary amounts) required to be provided by stakeholders, e.g., to other stakeholders for producing negative impacts on the other stakeholders.

Figure 1:
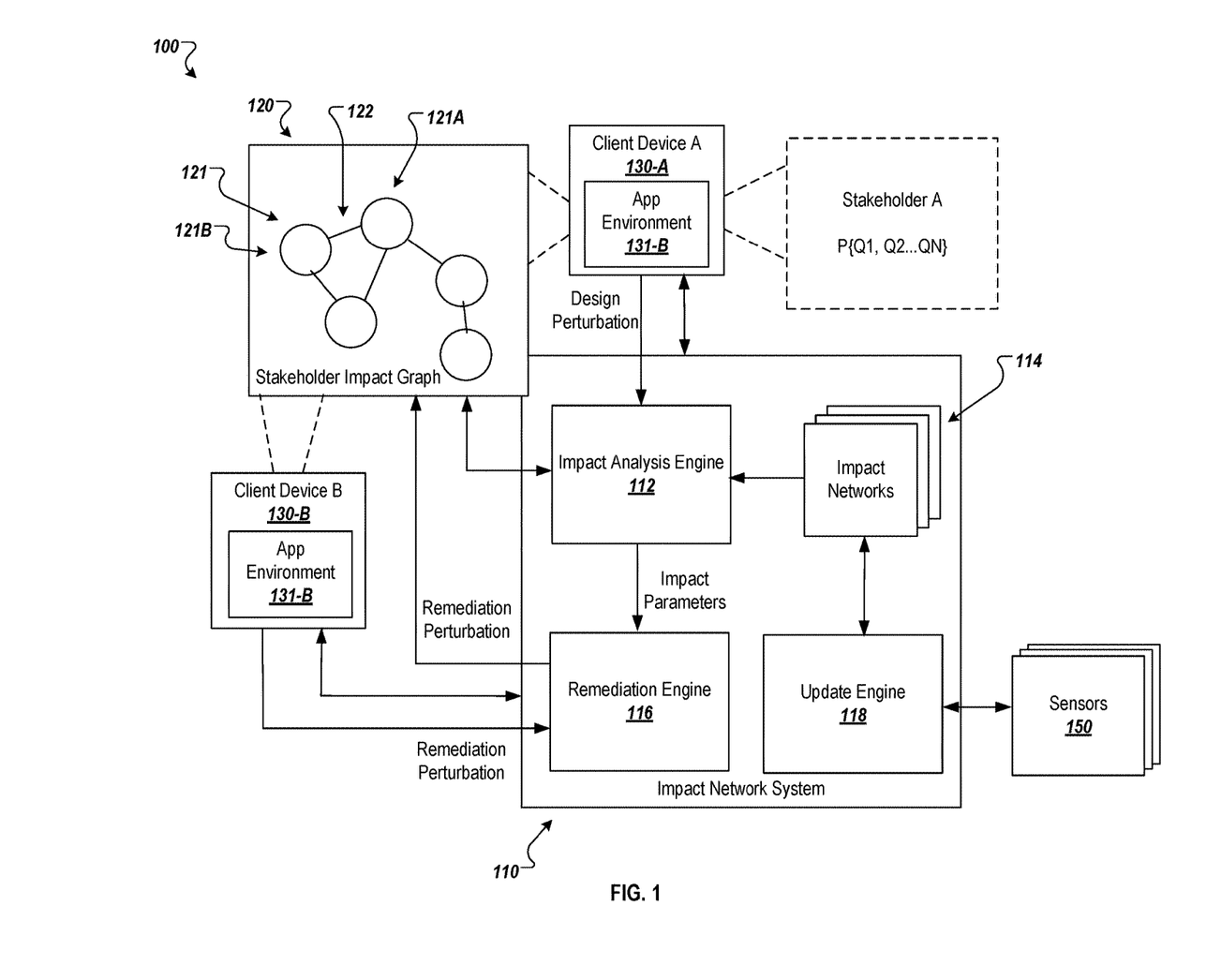
FIG. 1 depicts an example operating environment for an impact network system.

FIG. 1 depicts an example operating environment 100 for an impact network system 110. The impact network system 110 maintains impact networks 114 for various products or services. In some implementations, each impact network 114 can correspond to a particular product or service. In some implementations, an impact network 114 can correspond to multiple products or services.

An impact network 114 can specify relationships between stakeholders that are impacted by one or more products or services. The impact networks 114 can be in the form of stakeholder impact graphs, e.g., the stakeholder impact graph 120. A stakeholder impact graph can include a node 121 for each stakeholder and an edge 122 between connected stakeholders. The stakeholder impact graph 120 can include, for each edge, relationship data specifying a relationship between the nodes 121 connected by the edge 122.

The relationship data for two nodes can include data that defines one or more impact parameters of a first stakeholder represented by a first node 121A and the impact of the one or more impact parameters on one or more goals of a second stakeholder represented by a second node 121B. The goals can be qualitative goals (e.g., comfort of car attribute) and/or quantitative goals (e.g., additional noise, fuel efficiency, etc.).

The impact parameters and goals for two or more nodes can be based on the particular stakeholders represented by the nodes. For example, if the first stakeholder represented by the first node 121A produces a product or service, the impact parameters can be attributes of the product or service. In this example, the goals can be goals of stakeholders affected by changes to these attributes. For example, the goal of a person or organization affected by changes to tire attributes can be increased safety, reduce noise, reduced wear on roads, reduced pollution, reduced material use/cost, etc. The relationship between the tire manufacturer and the stakeholders can quantify the impact of the attributes of the tire on each goal of each stakeholder connected to the tire manufacturer and/or each indirect stakeholder connected to the tire manufacturer through other nodes in the stakeholder impact graph 120.

In another example, if neither of two stakeholders connected by an edge in the stakeholder impact graph 120 produce a product or service but instead are connected based on propagated impacts, described below, the impact parameters may be attributes of the stakeholder. For example, a first stakeholder's mood and productivity may be impacted by the noise produced by louder tires and a second stakeholder (e.g., the first stakeholder's colleague) may be affected by the first stakeholder's mood or productivity. In this example, the impact parameters for the first stakeholder may be mood and productivity and the goals of the second stakeholder may be increased productivity of the first stakeholder and increased mood of the first stakeholder. The relationship between the two stakeholders can quantity the impact of the changes to the first stakeholder's mood and productivity on the goals of the second stakeholder. For example, the mood can be quantified on a numerical scale (e.g., 1-10), and the impact on the second stakeholder's goal of increased mood can be based on, e.g., proportional to, the first stakeholder's mood.

As each stakeholder may value different goals differently, the relationship data can also specify a weight for each goal. For example, a person living near a major road may value reduced road noise caused by a tire more than other stakeholders, while a municipality may value reduced road wear more than other stakeholders. The weights can be used to determine the overall impact of an impact parameter on each stakeholder. For example, the overall impact on a stakeholder can be based on, e.g., equal to or proportional to, a sum of the product of each impact and its corresponding weight.

The impact network system 110 can maintain a respective impact network 114 for multiple products or services. The impact network 114 for a product or service can include a stakeholder graph 120 that connects the ecosystem of stakeholders related to that product or service, e.g., the entity that designs and/or provides the product or service and stakeholders that are affected by changes to the design of the product or service.

The impact network system 110 includes an impact analysis engine 112, a remediation engine 116, and an update engine 118. In general, the impact analysis engine 112 can generate impact networks 114 and analyze the impact of changes to impact parameters, e.g., design properties of a product or service, on stakeholders.

The impact analysis engine 112 can generate, for a product or service, an initial impact network based on a stakeholder graph that defines a set of connected stakeholders. This stakeholder graph can be similar to the stakeholder impact graph 120, but without the relationship data. The impact analysis engine 112, or a user (e.g., an impact specialist) can generate the relationship data, e.g., by estimating or predicting the impact of various impact parameters and the goals of the connected stakeholders.

The update engine 118 can update the initial impact networks 114 based on data received from various sensors 150. The sensors 150 can measure the actual impact of the impact parameters on at least some of the connected stakeholders. For example, if the impact network 114 is for a delivery service and an impact parameter is an addition of one-day delivery, the sensors 150 can include sensors that measure the number of delivery vehicles that leave delivery facilities, the weight or number of packages on each delivery vehicle, the number of miles driven by each delivery vehicle, the amount of pollution output per mile by the delivery vehicles, etc. This data can be used to measure impact parameters, such as the amount of increased traffic and the amount of increased pollution resulting from the addition of one-day delivery. The update engine 118 can update the impact network 114 to specify the appropriate impact of these parameters on each stakeholder, e.g., the people that live in the delivery area, the municipality that maintains the roads, etc.

In this example, the sensors 150 can also include location sensors, e.g., Global Positioning System (GPS) receivers, on each delivery vehicle. In this way, the update engine 118 can determine whether actual stakeholders are affected by the delivery vehicles, e.g., whether they delivery vehicles drive near the stakeholders home or workplaces, on the same roads, etc. Thus, the sensors 150 can provide different granularity of feedback for the impact networks 114.

In some implementations, the update engine 118 can use machine learning or artificial intelligence techniques to update the impact networks 114. The update engine 118 can use one or more machine learning models to estimate the actual impact of the impact parameters on the stakeholders based on updated information. For example, the update engine 118 can search for (e.g., using news alerts or Internet searches) updated information related to the impact parameters and/or the stakeholders. Continuing the delivery service example, the update engine 118 can search for information related to safety inspections and ratings on infrastructure (e.g., roads, bridges, air pollution, etc.) and/or news articles related to new building constructions (e.g., new stakeholders and/or additional delivery and other traffic), new roads or bridges (e.g., new stakeholders that may be impacted by the deliveries), and/or other stakeholders or parameters that could affect the impact on the stakeholders. At each update, the update engine 118 can use the machine learning model(s) to estimate the rate at which the infrastructure is impacted (e.g., the rate at which the infrastructure is being damaged) and/or the cost to repair the infrastructure. New data points for the condition of the infrastructure along with the tracking of actual usage of the infrastructure enables the update engine 118 to improve the existing impact network 114.

The update engine 118 can use a similar process to update the impact network 114 when new factors are introduced. For example, the update engine 118 can use a machine learning model to update the impact network 114 based on damage caused by a natural disaster, an increase or decrease in population of a geographic area, or the completion of a new construction project that uses a same roadway or bridge as part of delivering products or services via a delivery service. The update engine 118 can update the impact network to include new participants and/or to remove no longer relevancy participants.

The impact network system 110 can enable stakeholders to view the impact of impact parameters on themselves and/or other stakeholders. For example, the impact network system 110 can provide an interactive application environment 131 in the form of one or more interactive user interfaces viewable on client devices, of client devices 130-A and 130-B, or in the form of a native application installed on the client devices. For example, the client device 130-A provides access to the interactive application environment 131 and the client device 130-B provides access to the interactive application environment 131-B The interactive application environment 131 can enable stakeholders to modify impact parameters, e.g., design properties of a product or service, which results in a design perturbation to the design properties. For example, the interactive environment 131 can enable a car manufacturer to update design properties of a car. When the impact parameters are updated, the interactive application environment 131 can provide the updated impact parameters to the impact analysis engine 112.

In turn, the impact analysis engine 112 can obtain the impact network 114 for the product or service and use the impact network 114 to determine the impact of the updated impact parameters on the stakeholders included in the network model. For example the impact analysis engine 112 can use the impact parameters, the goals, and the weights described above to determine the impact on each goal of each stakeholder, an overall impact on each stakeholder, and an overall impact on all stakeholders in the impact network 114 (e.g., by summing the overall impact for each stakeholder).

The interactive application environment 131 can then present the results to the stakeholder that updated the impact parameters. The interactive application environment 131 can present the results within the stakeholder impact graph, e.g., with the impacts (or changes in impacts relative to the current design) presented by the node for each stakeholder along with the overall impact on all of the stakeholders. In another example, the interactive application environment 131 can present the impacts and/or changes in impacts in a table, chart, or other appropriate user interface. The interactive application environment 131 can present the impacts in real-time or near real-time, e.g., within 2-3 seconds.

In this way, the stakeholder can determine whether to move forward with the design change. The interactive application environment 131 can also present the results to the other stakeholders in the impact network 114, in real-time or near real-time. For example, the interactive environment 131 can send a notification to impacted stakeholders of a proposed design change that could impact them.

The interactive application environment 131 can also facilitate a marketplace in which the stakeholders can adjust, e.g., remediate or enhance, the impact of a design change. In one example, the interactive application environment 131 can enable the stakeholder making the design change to introduce additional design changes or additional products or services to adjust the impact. For example, if the stakeholder is a tire manufacturer, the tire manufacturer can use the interactive application environment 131 to introduce sound barriers for particular roads to reduce the impact of additional noise caused by a design change to its tires. The introduction of a remediation produce or service, such as a sound barrier, results in a remediation perturbation that adjusts one or more of the impacts caused by the design change on the other stakeholders. The remediation engine 116 can determine updated impacts based on the remediation perturbations and present the updated impacts to the stakeholder(s).

The interactive application environment 131 can facilitate interaction (e.g., negotiations) between the stakeholders to adjust the impact of updated impact parameters. For example, another entity can propose building the sound barriers for the tire manufacturer in exchange for something of value, e.g., money or credits, as described below. The interactive application environment 131 can enable communication between the stakeholders or direct updates to the stakeholder impact graph 120 by the stakeholders such that each stakeholder can view the updates to the stakeholder impact graph 120.

In some implementations, an entity, e.g., a governmental entity, can apply penalties for negative impacts and rewards for positive impacts. These penalties and rewards can be in the form of credits or money. For example, the impact network system 110 can provide a cap and trade system in which each stakeholder has a cap on the negative impacts that they produce. If a stakeholder wants to exceed their cap, they can trade with other stakeholders, e.g., including stakeholders in other impact networks 114, to obtain more credits. In another example, the entity can charge a monetary value based on the negative impacts created and/or provide monetary payment for positive impacts created. This incentives each stakeholder to strive for the highest positive impacts, even those that are not designing products or that are significantly impacted by the design changes.

To illustrate the operation of the impact network system 110, consider a design change made by a first stakeholder A using the interactive application environment 131-A running on the client device 130-A. The stakeholder A is represented by the node 121A in the stakeholder impact graph 120. When the stakeholder A makes a design change to a product or service, the interactive application environment 131-A provides, to the impact analysis engine 112, data defining a design perturbation in one or more design properties of the product or service.

The impact analysis engine 112 can obtain the impact network(s) for the product or service. The impact analysis engine 112 can then determine or update the impact of the design perturbation on each stakeholder in the impact network(s) using the relationship data specified by the impact network(s). As described above, the impacts can propagate through the nodes of the impact stakeholder graph 120 of an impact network 114 based on the relationships between the nodes. The function $P\{Q_1, Q_2 \ldots Q_n\}$ represents the impact Qi propagated to each stakeholder node 1-$n$.

The impact analysis engine 112 can update the stakeholder impact graph 120 or another user interface to present the determined impacts. Another stakeholder, stakeholder B, can provide a remediation to the updated impact caused by the design change introduced by stakeholder A using the interactive application environment 131-B running on the client device 130-B. For example, stakeholder B can add another product or service, or update the design properties of another product or service to either remediate or enhance the impact caused by stakeholder A. In response, the interactive application environment 131-B can provide, to the remediation engine 112, data specifying a remediation perturbation that adjusts the impact on the stakeholders. The remediation engine 116 can determine, based on the remediation perturbation, updated impacts of the stakeholders and/or an updated overall impact for all of the stakeholders in each impact network 114 for the product or service.

The interactive application environments 131-A and 131-B can present the updated impacts to stakeholder A and stakeholder B, respectively. Additional rounds of updates to design properties and remediations can be performed, e.g., until stakeholder A is satisfied with a set of design properties and corresponding impacts and reward/penalties for its product or service.

Figure 2A:
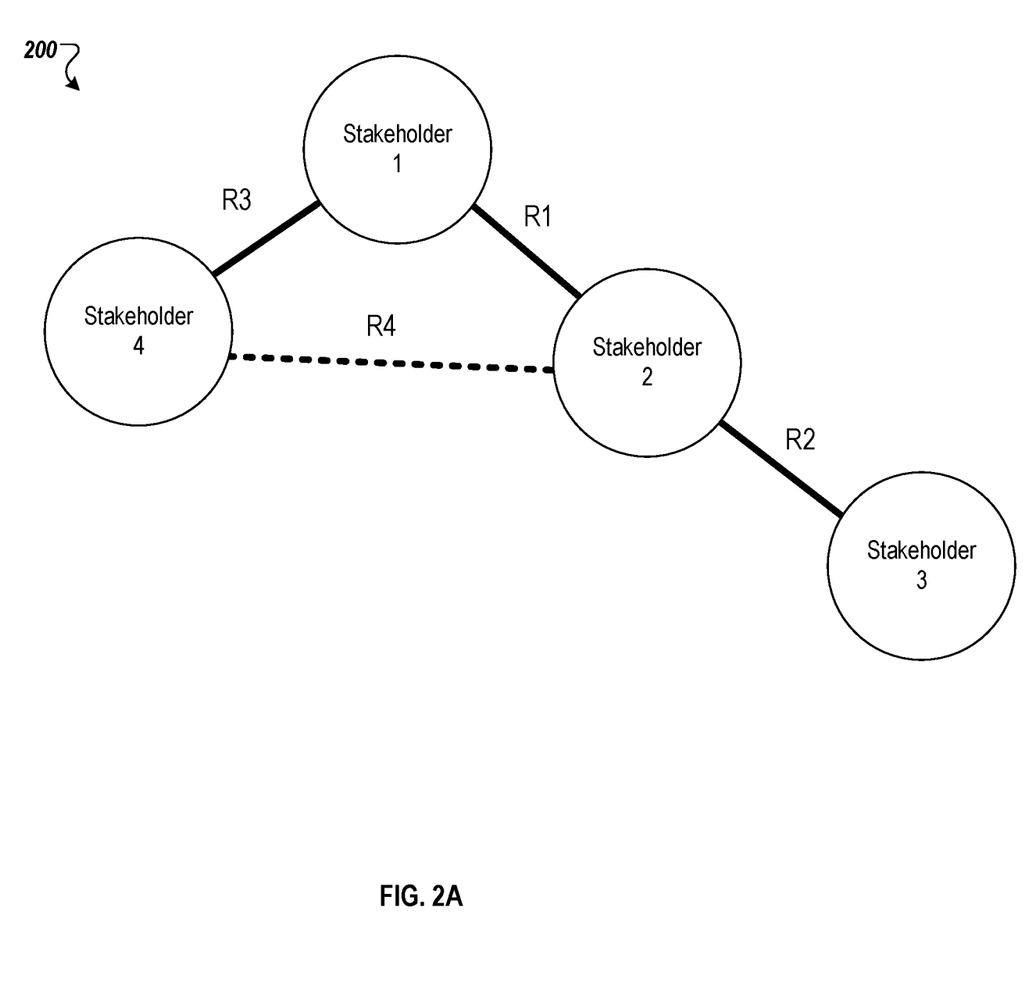
FIG. 2A depicts an example impact stakeholder graph for stakeholders of an impact network.

FIG. 2A depicts an example stakeholder impact graph 200 for stakeholders of an impact network. In this example, the stakeholder impact graph 200 includes four nodes for four stakeholders 1-4. However, stakeholder impact graphs can include other numbers of stakeholders. Stakeholder 1 can be an entity that produces a product or service that impacts the other stakeholders either directly or indirectly. An edge between two stakeholders represents a direct impact between the two stakeholders. A stakeholder connected to another stakeholder through one or more other stakeholders represents an indirect impact between the stakeholder and the other stakeholder.

In this example, the product or service of stakeholder 1 impacts stakeholders 2 and 4 directly, and stakeholder 3 indirectly. In addition, the product or service of stakeholder 1 impacts stakeholder 2 indirectly via stakeholder 4 and impacts stakeholder 4 indirectly via stakeholder 2. For example, if stakeholder 1 adds restaurant meal delivery to its other shipping and delivery services and stakeholders 2 and 4 are neighboring restaurants, this may add traffic to stakeholder 4 if stakeholder 2 participates in the meal delivery and may add traffic to stakeholder 4 is stakeholder 2 participates in the meal delivery. The delivery and shipping services of stakeholder 1 may also impact stakeholders 2 and 4 directly, e.g., if they use other shipping services of stakeholder 1 or are in the area in which stakeholder 1 delivers or ships products.

The stakeholder impact graph 200 includes a relationship ($R_i$) between each pair of connected nodes. As described above, the relationship data for two nodes can include data that defines one or more impact parameters of a first stakeholder represented by a first node 121A and the impact of the one or more impact parameters on one or more goals of a second stakeholder represented by a second node 121B.

Figure 2B:
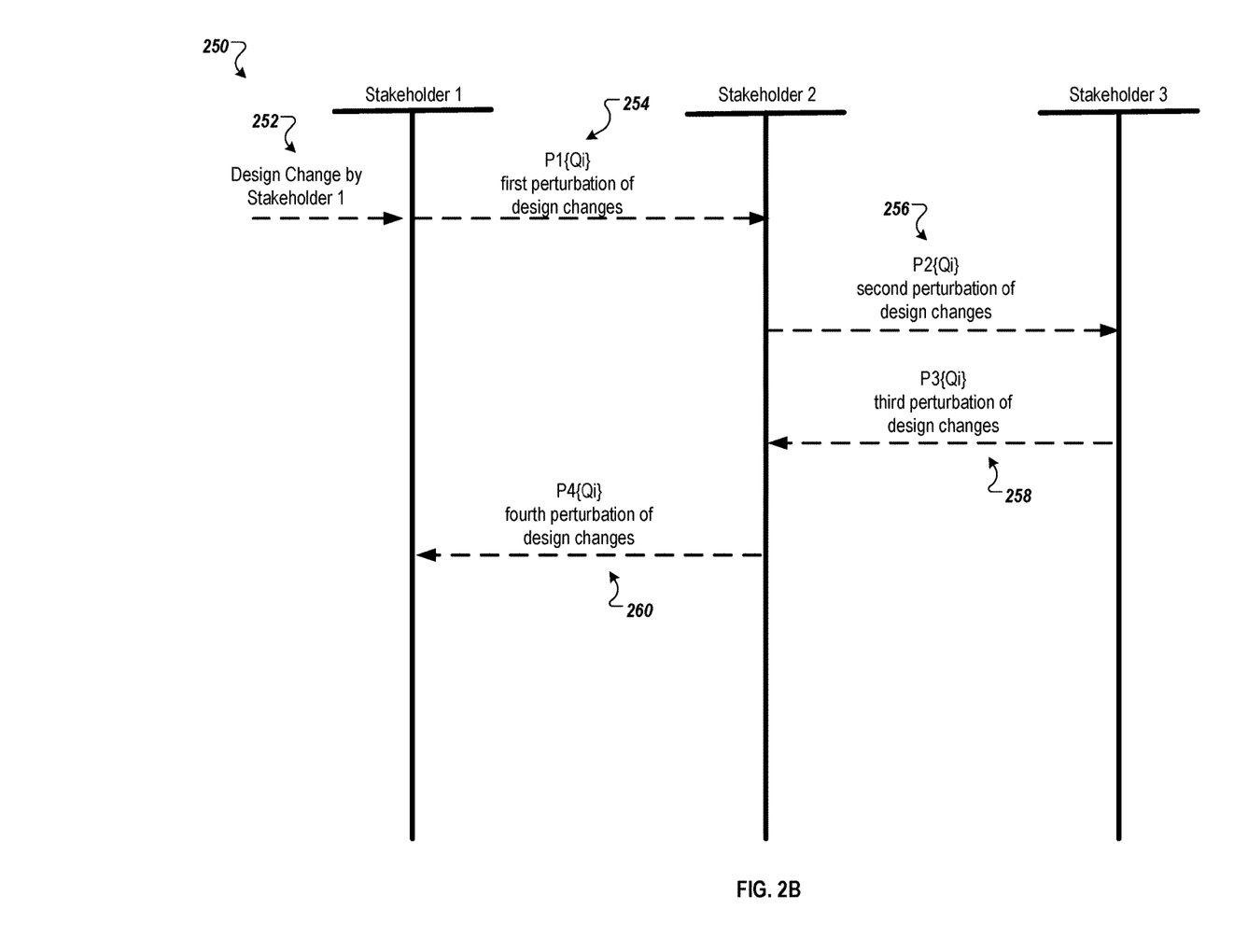
FIG. 2B depicts an example of impact propagation between stakeholders of an impact network.

FIG. 2B depicts a process flow of an example impact propagation process 250 between stakeholders of an impact network. The impact network can include the stakeholder impact graph 200 of FIG. 2A and the propagation of the impact involves stakeholders 1-3 of FIG. 2B.

At stage 252, stakeholder 1 initiates a design change to a product or service. The design change can include a change to one or more properties of the product or service. For example, the design change can be a different part, a different material, a different delivery route, different delivery vehicles, a new location for a service or business, etc. Stakeholder 1 can initiate the design change using an interactive application interface, as described above. For the purpose of this example, assume that stakeholder 1 is a tire manufacturer.

At stage 254, a first perturbation of the design changes is propagated to stakeholder 2. The first perturbation of the design changes can impact stakeholder 2 directly based on the direct connection between the two stakeholders in the stakeholder impact graph 200. The level of impact on each goal of stakeholder 2 is based on the relationship between stakeholders 1 and 2, as defined by the relationship data in the stakeholder impact graph 200. For example, stakeholder 2 may be a driver that will purchase the tires manufactured by stakeholder 1. The change to the design of the tires may impact the safety, comfort, and finances of stakeholder 2.

As stakeholder 2 is also connected to stakeholder 3 in the stakeholder impact graph 200, the design changes can also impact stakeholder 3. At stage 256, a second perturbation of the design changes is propagated to stakeholder 3 based on the relationship between stakeholder 2 and stakeholder 3. For example, stakeholder 3 may live in the same area as stakeholder 2 and may be affected by noise made by the tires, wear to the roads caused by the tires, the safety of the tires, e.g., if the tires cause an accident, etc. In another example, stakeholder 3 may be a passenger of stakeholder 2 and stakeholder 3 may be affected by the comfort and safety of the tires. In yet another example, stakeholder 3 may be a municipality where stakeholder 2 drives and may be affected by the wear to the roads caused by the tires. The level of impact on each goal of stakeholder 3 is based on the relationship between stakeholders 2 and 3, as defined by the relationship data in the stakeholder impact graph 200.

At stage 258, a third perturbation of the design changes is propagated back to stakeholder 2. For example, stakeholder 2 may have goals that are impacted by stakeholder 3, as defined by a relationship between the two stakeholders. In a particular example, if stakeholder 3 is the neighbor and friend of stakeholder 2, an increase in noise caused by the tires may affect the mood of stakeholder 2, which could impact stakeholder 3. The level of impact on each goal of stakeholder 2 is based on the relationship between stakeholders 2 and 3, as defined by the relationship data in the stakeholder impact graph 200.

At stage 260, a fourth perturbation of the design changes is propagated back to stakeholder 1. For example, stakeholder 1 may have goals that are impacted by stakeholder 2, as defined by a relationship between the two stakeholders. In a particular example, stakeholder 1 may have a goal to sell more tires to stakeholder 2. However, if the tires are very noisy, affecting the mood of the neighbor stakeholder 3, stakeholder 2 may be less likely to purchase tires from stakeholder 1 in the future. The level of impact on this goal of selling more tires based on the impact of stakeholder's mood relative to the tires can be defined in the relationship between stakeholders 1 and 2 in the stakeholder impact graph 200.

This process flow shows how a change in design properties can be measured and propagated to each stakeholder in an impact network. As described above, each stakeholder can view the impacts and generate remediation perturbations to remediate or enhance the impacts.

Figure 3:
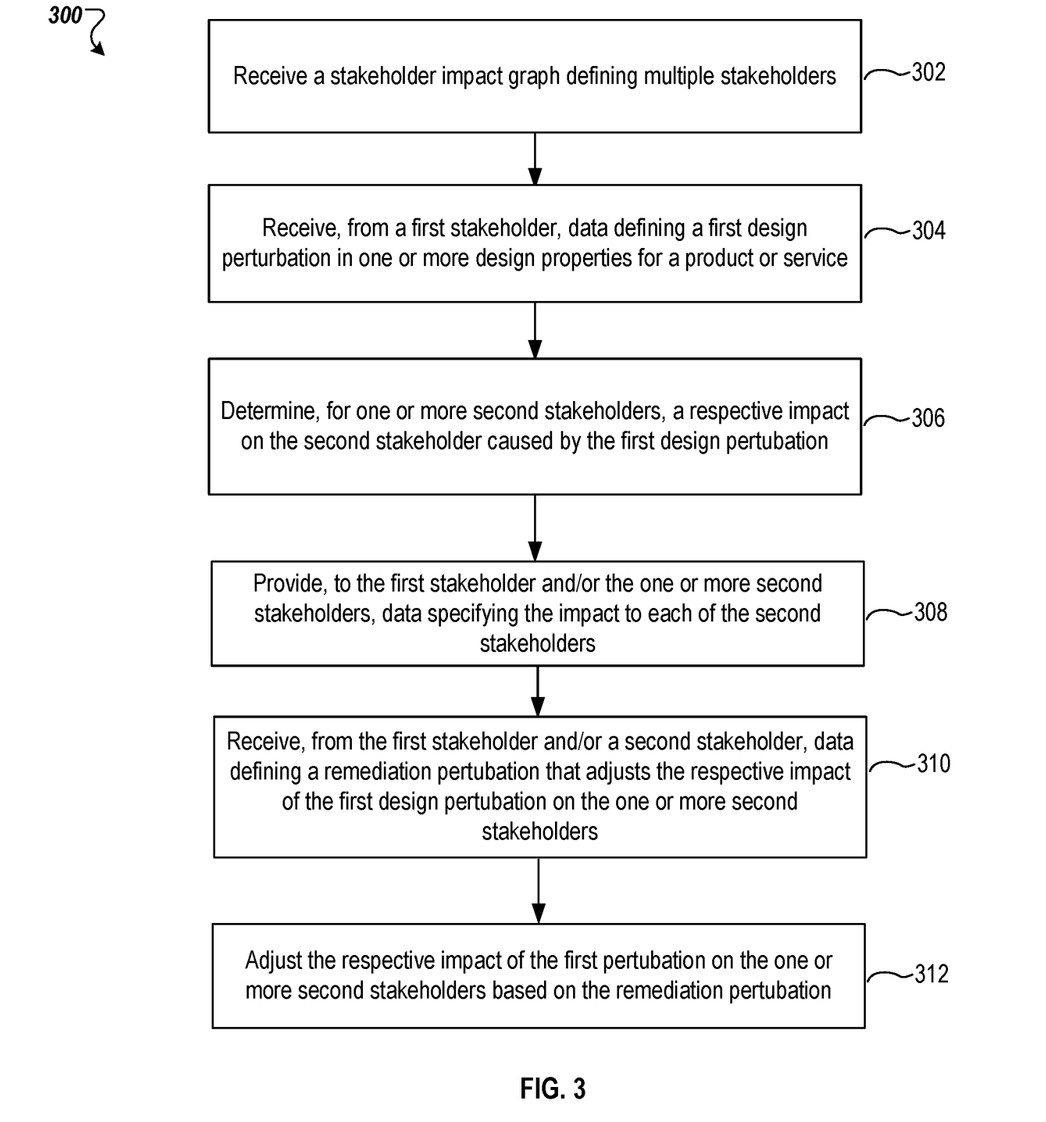
FIG. 3 is a flow diagram of an example process for adjusting an impact of a perturbation in one or more design properties on one or more stakeholders.

FIG. 3 is a flow diagram of an example process 300 for adjusting an impact of a perturbation in one or more design properties on one or more stakeholders. The process 300 can be performed by the impact network system 110 of FIG. 1. Operations of the process 300 can also be implemented as instructions stored on non-transitory computer readable media, and execution of the instructions by one or more data processing apparatus can cause the one or more data processing apparatus to perform the operations of the process 300.

A stakeholder impact graph is received (302). The stakeholder impact graph can be part of an impact network that includes an ecosystem of connected stakeholders that are impacted by a particular product or service, e.g., that are impacted based on changes to design properties of the product or service. As described above, a stakeholder impact graph can include a node for each stakeholder and edges between connected stakeholders. Each edge can also include relationship data that defines the relationship between the connected stakeholders.

Data defining a first design perturbation in one or more design properties of the product or service is received (304). For example, the impact network system can receive the data defining the first design perturbation from a first stakeholder that provides the product or service. The first stakeholder can use an interactive application environment to specify a change to one or more design properties of the product or service.

A determination is made of an impact on one or more second stakeholders connected to the first stakeholder (306). For example, the impact network system can determine, based on the change to the one or more design properties and the relationship data for the first stakeholder and a second stakeholder connected to the first stakeholder, a level of impact on one or more goals of the second stakeholder. As described above, the relationship data can include a weight for each goal. The impact network system can also determine an overall impact on the second stakeholder based on the level of impact for each goal and the weight for each goal. For example, the overall impact can be a sum of the product of each level of impact and its corresponding weight.

Data specifying the impact is provider (308). The data can be provided to the first stakeholder and one or more of the second stakeholders. For example, the impact network system can update the stakeholder impact graph to indicate the determined level of impact on each stakeholder caused by the first design perturbation of the one or more design properties.

Data defining a remediation perturbation that adjusts the impact of the first design perturbation is received (310). For example, one or more of the stakeholders can generate the remediation perturbation to adjust the impact of the first design perturbation on the second stakeholders. This remediation perturbation can enhance or remediate the impact. For example, if the impact is positive, a stakeholder may want to increase this positive impact. If the impact is negative, a stakeholder may want to reduce the impact. The remediation perturbation can be caused by introducing a new product or service, or changing the properties of a product or service, which adjusts the impact on the second stakeholders. For example, if the first perturbation results in more pollution, the remediation perturbation can be caused by introducing a pollution control product or service.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a stand-alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any appropriate kind of digital computer. Generally, a processor will receive instructions and data from a read only memory or a random access memory or both. Elements of a computer can include a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, implementations may be realized on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any appropriate form of sensory feedback, e.g., visual feedback, auditory feedback, or tactile feedback; and input from the user may be received in any appropriate form, including acoustic, speech, or tactile input.

Implementations may be realized in a computing system that includes a back end component, e.g., as a data server, or that includes a middleware component, e.g., an application server, or that includes a front end component, e.g., a client computer having a graphical user interface or a Web browser through which a user may interact with an implementation, or any appropriate combination of one or more such back end, middleware, or front end components. The components of the system may be interconnected by any appropriate form or medium of digital data communication (e.g., a communication network). Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

Figure 4:
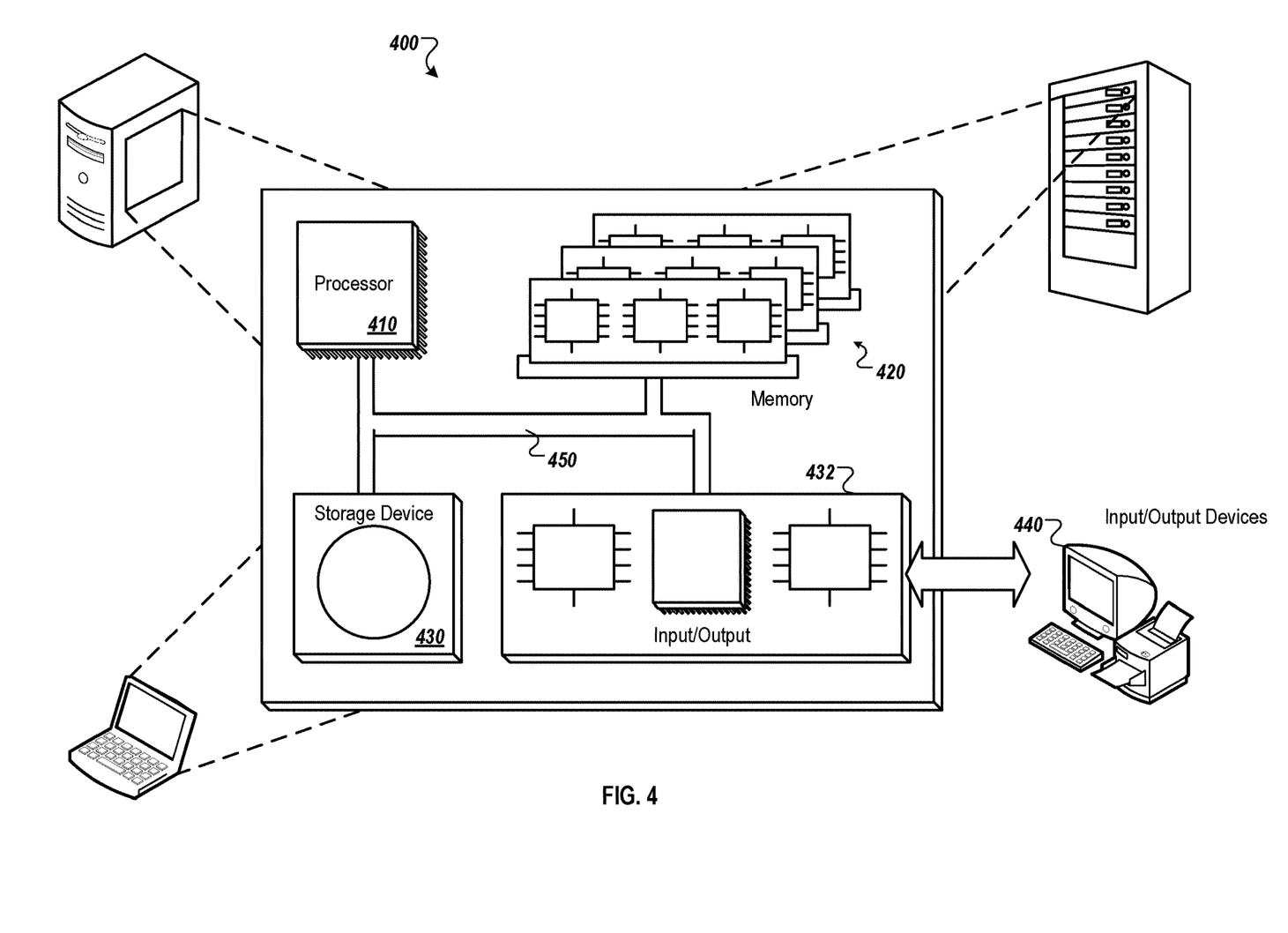
FIG. 4 is a block diagram of an example computer system.

An example of one such type of computer is shown in FIG. 4, which shows a schematic diagram of a generic computer system 400. The system 400 can be used for the operations described in association with any of the computer-implemented methods described previously, according to one implementation. The system 400 includes a processor 410, a memory 420, a storage device 430, and an input/output device 440. Each of the components 410, 420, 430, and 440 are interconnected using a system bus 450. The processor 410 is capable of processing instructions for execution within the system 400. In one implementation, the processor 410 is a single-threaded processor. In another implementation, the processor 410 is a multi-threaded processor. The processor 410 is capable of processing instructions stored in the memory 420 or on the storage device 430 to display graphical information for a user interface on the input/output device 440.

The memory 420 stores information within the system 400. In one implementation, the memory 420 is a computer-readable medium. In one implementation, the memory 420 is a volatile memory unit. In another implementation, the memory 420 is a non-volatile memory unit.

The storage device 430 is capable of providing mass storage for the system 400. In one implementation, the storage device 430 is a computer-readable medium. In various different implementations, the storage device 430 may be a floppy disk device, a hard disk device, an optical disk device, or a tape device.

The input/output module 432 includes hardware or hardware and software for interfacing system 400 with the input/output device 440 or other devices or interfaces.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

What is claimed is:

1. A method comprising:
   generating a stakeholder impact graph defining a plurality of stakeholders, wherein each stakeholder is a node that is connected to at least one other stakeholder by an impact relationship edge, wherein each edge between two nodes represents a set of one or more impact parameters that each define an impact of a respective design property for a product corresponding to a first node of the two nodes on a stakeholder corresponding to a second node of the two nodes;
   measuring, using one or more impact detection sensors configured to detect changes in properties of physical objects, respective actual impacts of changes to design properties of a set of products on at least a subset of the plurality of stakeholders resulting from changes to the properties of the physical objects caused by the changed designed properties for the set of products;
   updating the impact parameters of the stakeholder graph based on the measured actual impacts of the changes to the design properties of the set of products, wherein updating the impact parameters of the stakeholder graph comprises,
      estimating, using a trained machine learning model, a rate at which infrastructure is impacted by the changes to the design properties of the set of products and/or services, and
      updating the impact parameters of the stakeholder graph based on the estimated rate at which the infrastructure is impacted;
   receiving, from a first stakeholder of the plurality of stakeholders, data defining a first design perturbation in one or more design properties for a product of the first stakeholder;
   determining, for one or more second stakeholders of the plurality of stakeholders connected to the first stakeholder by a respective impact relationship edge, a respective impact on the second stakeholder caused by the first design perturbation;
   providing, to at least one of the first stakeholder or the one or more second stakeholders, data specifying the impact to the one or more second stakeholders; and
   receiving, from at least one of the first stakeholder or at least one of the one or more second stakeholders, data defining a remediation perturbation that adjusts the respective impact of the first design perturbation on the one or more second stakeholders.

2. The method of claim 1, wherein receiving the data defining the remediation perturbation comprises receiving, from a given second stakeholder, data defining a second design perturbation in one or more second design properties of a second product or service that reduces the impact of the first design perturbation on the one or more second stakeholders.

3. The method of claim 2, wherein the second product comprises a new product or service that, if implemented, would reduce the impact of the first design perturbation on the one or more second stakeholders.

4. The method of claim 1, wherein receiving the data defining the remediation perturbation comprises receiving, from the first stakeholder, data defining a second perturbation in the one or more design properties of the product of the first stakeholder.

5. The method of claim 4, wherein the second perturbation in the one or more design properties comprises a change in at least one of the one or more design properties of the product.

6. The method of claim 1, wherein providing the data specifying the impact to each of the second stakeholders comprises providing, in an interactive application environment, the data specifying the impact to each of the second stakeholders to each of the first stakeholder and the one or more second stakeholders.

7. The method of claim 6, wherein the interactive application environment facilitates an exchange of design perturbations and remediation perturbations by the plurality of stakeholders, and wherein modified impacts are determined from the exchanged design perturbations and remediation perturbations in real-time.

8. The method of claim 1, wherein each product comprises a physical product or a service.

9. A non-transitory computer-readable storage media coupled to one or more processors and having instructions stored thereon which, when executed by the one or more processors, cause the one or more processors to perform operations for a design recommendation engine, the operations comprising:
generating a stakeholder impact graph defining a plurality of stakeholders, wherein each stakeholder is a node that is connected to at least one other stakeholder by an impact relationship edge, wherein each edge between two nodes represents a set of one or more impact parameters that each define an impact of a respective design property for a product corresponding to a first node of the two nodes on a stakeholder corresponding to a second node of the two nodes;
measuring, using one or more impact detection sensors configured to detect changes in properties of physical objects, respective actual impacts of changes to design properties of a set of products on at least a subset of the plurality of stakeholders resulting from changes to the properties of the physical objects caused by the changed designed properties for the set of products;
updating the impact parameters of the stakeholder graph based on the measured actual impacts of the changes to the design properties of the set of products, wherein updating the impact parameters of the stakeholder graph comprises,
estimating, using a trained machine learning model, a rate at which infrastructure is impacted by the changes to the design properties of the set of products and/or services, and
updating the impact parameters of the stakeholder graph based on the estimated rate at which the infrastructure is impacted;
receiving, from a first stakeholder of the plurality of stakeholders, data defining a first design perturbation in one or more design properties for a product of the first stakeholder;
determining, for one or more second stakeholders of the plurality of stakeholders connected to the first stakeholder by a respective impact relationship edge, a respective impact on the second stakeholder caused by the first design perturbation;
providing, to at least one of the first stakeholder or the one or more second stakeholders, data specifying the impact to the one or more second stakeholders; and
receiving, from at least one of the first stakeholder or at least one of the one or more second stakeholders, data defining a remediation perturbation that adjusts the respective impact of the first design perturbation on the one or more second stakeholders.

10. The non-transitory computer-readable storage media of claim 9, wherein receiving the data defining the remediation perturbation comprises receiving, from a given second stakeholder, data defining a second design perturbation in one or more second design properties of a second product or service that reduces the impact of the first design perturbation on the one or more second stakeholders.

11. The non-transitory computer-readable storage media of claim 10, wherein the second product comprises a new product or service that, if implemented, would reduce the impact of the first design perturbation on the one or more second stakeholders.

12. The non-transitory computer-readable storage media of claim 9, wherein receiving the data defining the remediation perturbation comprises, receiving, from the first stakeholder, data defining a second perturbation in the one or more design properties of the product of the first stakeholder.

13. The non-transitory computer-readable storage media of claim 12, wherein the second perturbation in the one or more design properties comprises a change in at least one of the one or more design properties of the product.

14. The non-transitory computer-readable storage media of claim 9, wherein providing the data specifying the impact to each of the second stakeholders comprises providing, in an interactive application environment, the data specifying the impact to each of the second stakeholders to each of the first stakeholder and the one or more second stakeholders.

15. A system, comprising:
one or more processors; and
a computer-readable storage device coupled to the one or more processors and having instructions stored thereon which, when executed by the one or more processors, cause the one or more processors to perform operations for a design recommendation engine, the operations comprising:
generating a stakeholder impact graph defining a plurality of stakeholders, wherein each stakeholder is a node that is connected to at least one other stakeholder by an impact relationship edge, wherein each edge between two nodes represents a set of one or more impact parameters that each define an impact of a respective design property for a product corresponding to a first node of the two nodes on a stakeholder corresponding to a second node of the two nodes;
measuring, using one or more impact detection sensors configured to detect changes in properties of physical objects, respective actual impacts of changes to design properties of a set of products on at least a subset of the plurality of stakeholders resulting from changes to the properties of the physical objects caused by the changed designed properties for the set of products;
updating the impact parameters of the stakeholder graph based on the measured actual impacts of the changes to the design properties of the set of products, wherein updating the impact parameters of the stakeholder graph comprises,
estimating, using a trained machine learning model, a rate at which infrastructure is impacted by the changes to the design properties of the set of products and/or services, and
updating the impact parameters of the stakeholder graph based on the estimated rate at which the infrastructure is impacted;

receiving, from a first stakeholder of the plurality of stakeholders, data defining a first design perturbation in one or more design properties for a product of the first stakeholder;

determining, for one or more second stakeholders of the plurality of stakeholders connected to the first stakeholder by a respective impact relationship edge, a respective impact on the second stakeholder caused by the first design perturbation;

providing, to at least one of the first stakeholder or the one or more second stakeholders, data specifying the impact to the one or more second stakeholders; and receiving, from at least one of the first stakeholder or at least one of the one or more second stakeholders, data defining a remediation perturbation that adjusts the respective impact of the first design perturbation on the one or more second stakeholders.

16. The system of claim 15, wherein receiving the data defining the remediation perturbation comprises receiving, from a given second stakeholder, data defining a second design perturbation in one or more second design properties of a second product or service that reduces the impact of the first design perturbation on the one or more second stakeholders.

17. The system of claim 16, wherein the second product comprises a new product or service that, if implemented, would reduce the impact of the first design perturbation on the one or more second stakeholders.

18. The system of claim 15, wherein receiving the data defining the remediation perturbation comprises, receiving, from the first stakeholder, data defining a second perturbation in the one or more design properties of the product of the first stakeholder.

19. The system of claim 18, wherein the second perturbation in the one or more design properties comprises a change in at least one of the one or more design properties of the product.

20. The system of claim 15, wherein providing the data specifying the impact to each of the second stakeholders comprises providing, in an interactive application environment, the data specifying the impact to each of the second stakeholders to each of the first stakeholder and the one or more second stakeholders.

* * * * *